United States Patent
Chen et al.

(10) Patent No.: US 6,628,515 B2
(45) Date of Patent: Sep. 30, 2003

(54) DISK DRIVE BRACKET WITH PRESSING MEANS

(75) Inventors: Yun Lung Chen, Taipei (TW); Jung Chi Chen, Taipei (TW); Yu Tai Liu, Taipei (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 102 days.

(21) Appl. No.: 09/990,969

(22) Filed: Nov. 14, 2001

(65) Prior Publication Data

US 2003/0090868 A1 May 15, 2003

(51) Int. Cl.[7] .................................................. G06F 1/16
(52) U.S. Cl. ........................ 361/685; 312/333; 439/159; 248/535
(58) Field of Search ................................ 361/685, 683, 361/684, 686, 724–727; 312/332.1, 333, 223.2; 439/152, 155, 157, 159; 248/27.1, 27.3, 535

(56) References Cited

U.S. PATENT DOCUMENTS 6,388,875 B1 * 5/2002 Chen ........................... 361/685
6,396,686 B1 * 5/2002 Liu et al. ..................... 361/685
6,456,489 B1 * 9/2002 Davis et al. ................. 361/684
6,464,085 B1 * 10/2002 Chin et al. .................... 211/26

* cited by examiner

Primary Examiner—Darren Schuberg
Assistant Examiner—Hung Van Duong
(74) Attorney, Agent, or Firm—Wei Te Chung

(57) ABSTRACT

A disk drive bracket (10) includes a bottom panel (12) and first and second side panels (14, 16) extending from opposite edges of the bottom panel. The first side panel includes a first support portion (42), a pair of first pressing tabs (44), and a pair of elastic pads (48). The second side panel includes a second support portion (62), and a pair of second pressing tabs (64). The second side panel further defines a pair of through holes (68) for insertion of screws (80) therethrough. The first and second support portions support a data storage device (100) thereon. The first and second pressing tabs depress the storage device. The elastic pads inwardly press the storage device. The storage device cannot move in any direction. Thus, the disk drive bracket readily and firmly secures the storage device therein.

9 Claims, 2 Drawing Sheets

DISK DRIVE BRACKET WITH PRESSING MEANS

BACKGROUND OF THE INVENTION

1. Field of the Invention

The present invention relates to disk drive brackets in computers, and more particularly to disk drive brackets which readily and firmly secure data storage devices therein.

2. Description of Related Art

Conventionally, a computer data storage device is directly secured to a disk drive bracket using screws. Installation and removal of the screws requires a tool. This is unduly complicated and laborious, and reduces the efficiency of assembly in mass production facilities.

A common means to overcome the above shortcomings is to have a pair of slideways formed in opposite side walls of the bracket. An additional sliding rail is then fastened to each side of the storage device with screws. Thus, the storage device can be readily slid into and secured to the bracket.

Another common means to help overcome the above shortcomings is to have fasteners at one side of the storage device. The fasteners are used instead of screws. The opposite side of the storage device is still secured to the bracket with screws.

However, the sliding rails and the fasteners themselves still need to be secured to the storage device or the bracket. In addition, the need to manufacture sliding rails or fasteners increases costs. Furthermore, the storage device is secured to the bracket only at opposite sides of the storage device. This ensures that the storage device is prevented from moving in longitudinal and vertical directions. But the storage device is not prevented from moving in lateral directions.

SUMMARY OF THE INVENTION

Accordingly, an object of the present invention is to provide a disk drive bracket which readily and firmly secures a data storage device therein.

Another object of the present invention is to provide a disk drive bracket which is cost-efficient.

In order to achieve the objects set out above, a disk drive bracket of the present invention comprises a bottom panel, and first and second side panels extending from opposite edges of the bottom panel. The first side panel comprises a first support portion, a pair of first pressing tabs, and a pair of elastic pads. The second side panel comprises a second support portion, and a pair of second pressing tabs. The second side panel further defines a pair of through holes for insertion of screws therethrough. The first and second support portions support a data storage device thereon. The first and second pressing tabs depress the storage device. The elastic pads inwardly press the storage device. The storage device cannot move in any direction. Thus, the disk drive bracket readily and firmly secures the storage device therein.

Other objects, advantages and novel features of the present invention will become more apparent from the following detailed description when taken in conjunction with the accompanying drawings.

DETAILED DESCRIPTION OF THE INVENTION

Figure 1:
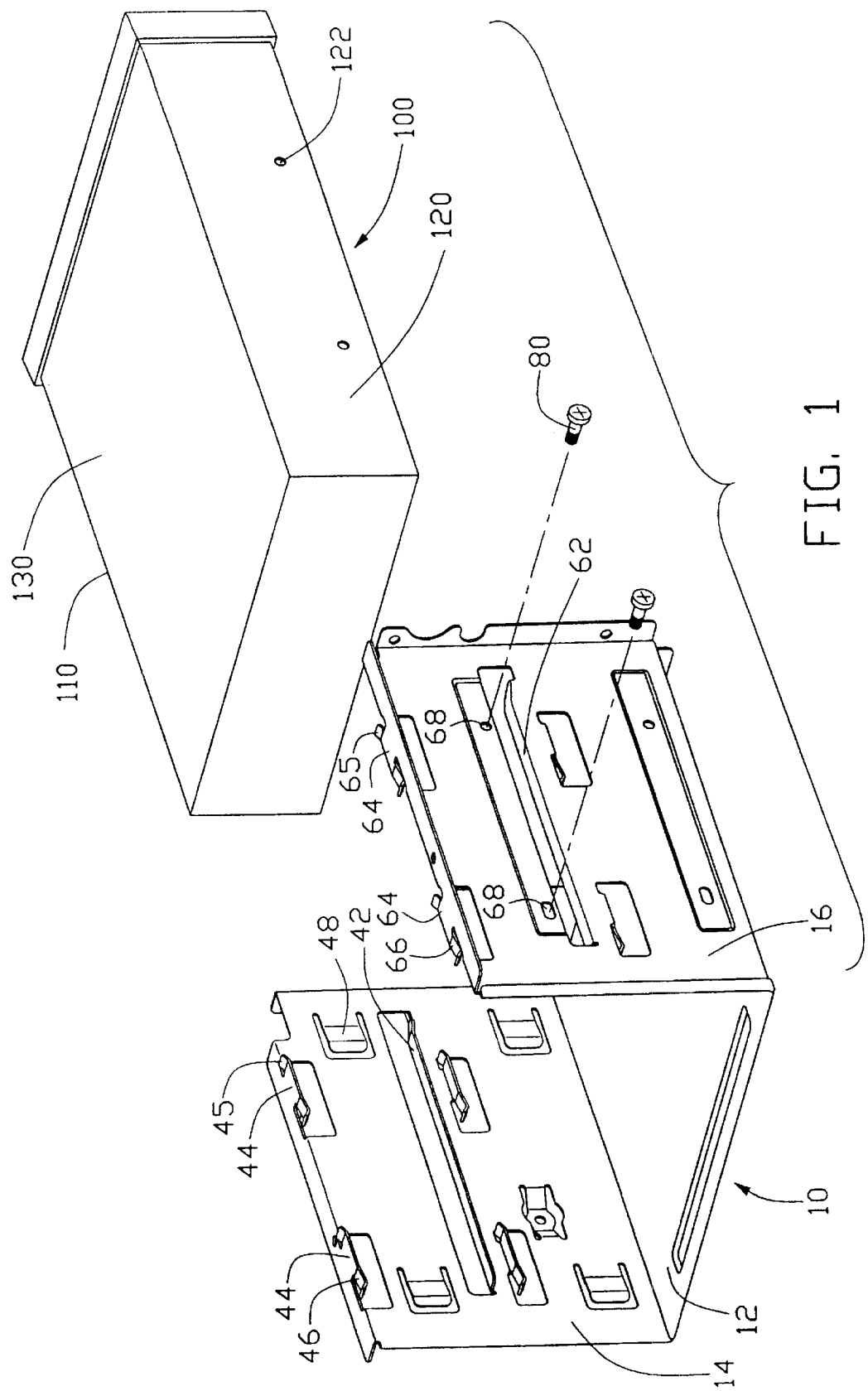
FIG. 1 is an exploded view of a disk drive bracket in accordance with the present invention, together with a data storage device.

Reference will now be made to the drawing figures to describe the preferred embodiment of the present invention in detail.

Referring to FIG. 1, a disk drive bracket 10 of a preferred embodiment of the present invention secures a data storage device 100 therein. The bracket 10 comprises a bottom panel 12, and first and second side panels 14, 16. The storage device 100 comprises first and second sidewalls 110, 120 and a top wall 130. The sidewalls 110, 120 are parallel to each other and perpendicular to the top wall 130. A pair of screw holes 122 is defined in the second sidewall 120. A pair of screws 80 secures the storage device 100 to the bracket 10.

The first side panel 14 of the bracket 10 extends vertically upwardly from an edge of the bottom panel 12. A first support portion 42 extends horizontally inwardly from the first side panel 14, for supporting the storage device 100 thereon. A pair of first pressing tabs 44 is stamped horizontally inwardly from the first side panel 14, above the first support portion 42. A first guide lip 45 is upwardly bent from a front portion of each first pressing tab 44. A first tail 46 is formed at a rear portion of each first pressing tab 44. Each first tail 46 has a generally V-shaped configuration, and is disposed below a main portion of its first pressing tab 44. The configuration of each first tail 46 allows its first pressing tab 44 to be elastically deflectable. A pair of spaced elastic pads 48 is inwardly stamped from the first side panel 14, between the first support portion 42 and the first pressing tabs 44. A front portion of each elastic pad 48 is integrally joined with the first side panel 14.

The second side panel 16 of the bracket 10 extends vertically upwardly from an opposite edge of the bottom panel 12, parallel to the first side panel 14. A second support portion 62 extends horizontally inwardly from the second side panel 16. The second support portion 62 is coplanar with the first support portion 42 of the first side panel 14. A pair of second pressing tabs 64 is stamped horizontally inwardly from the second side panel 64, disposed above the second support portion 62. A second guide lip 65 is upwardly bent from a front portion of each second pressing tab 64. A second tail 66 is formed at a rear portion of each second pressing tab 64. Each second tail 66 has a generally V-shaped configuration, and is disposed below a main portion of its second pressing tab 64. The configuration of each second tail 66 allows its second pressing tab 64 to be elastically deflectable. A pair of through holes 68 is defined in the second side panel 16, between the second support portion 62 and the second pressing tabs 64.

Figure 2:
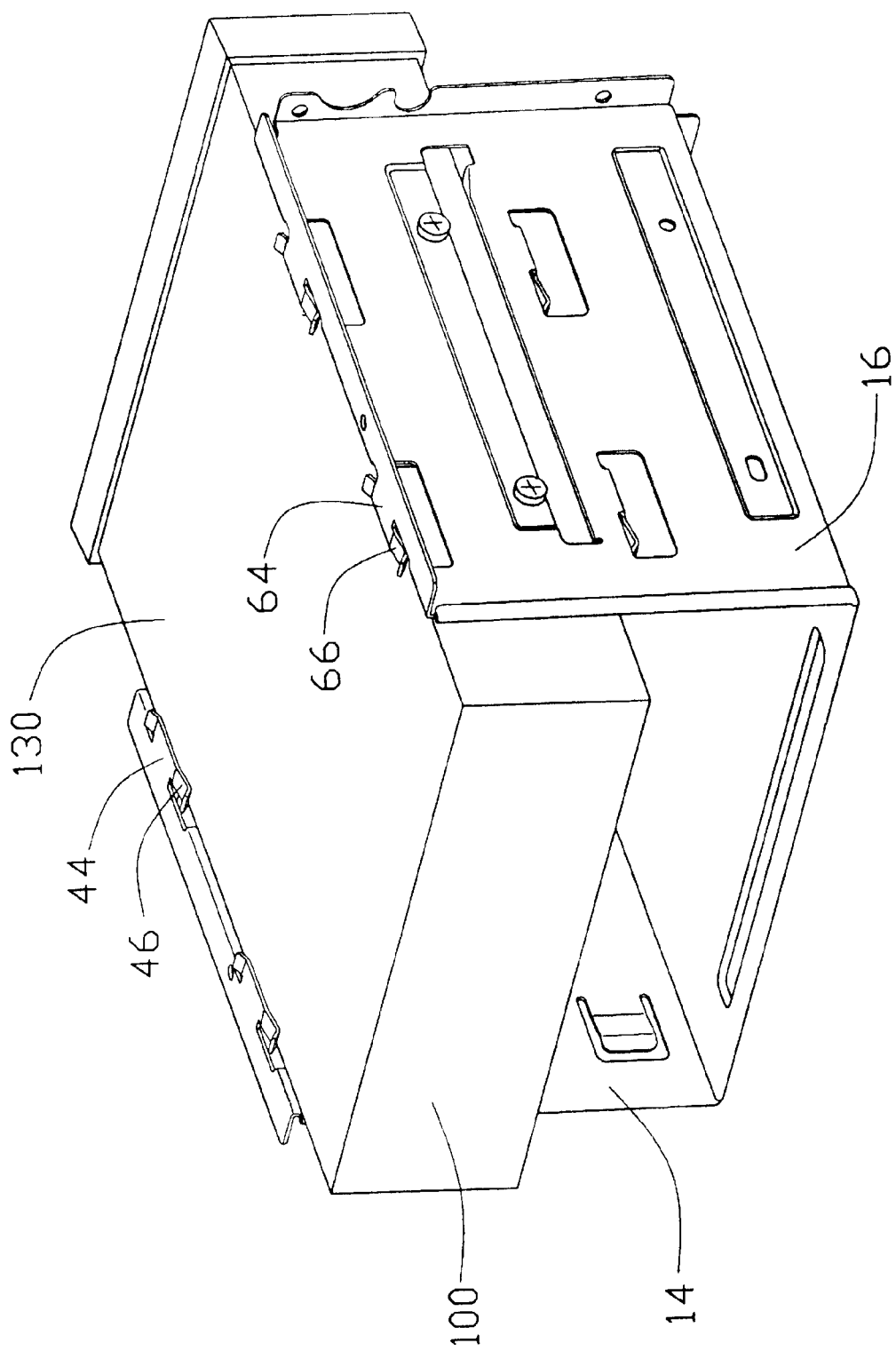
FIG. 2 is an assembled view of FIG. 1.

Referring also to FIG. 2, in use of the bracket 10, the storage device 100 is supported on front portions of the first and second support portions 42, 62. The storage device 100 is pushed into the bracket 10, passing over the first and second pressing tabs 44, 64 until it is fully received in the bracket 10. The elastic pads 48 of the first side panel 14 are pressed outwardly by the first sidewall 110 of the storage device 100. The screw holes 122 of the storage device 100 are aligned with the through holes 68 of the bracket 10. The screws 80 are inserted through the through holes 68 and engaged in the screw holes 122. Thus, the storage device 100 is easily received into the bracket 10. The top wall 130 of the storage device 100 is pressed by the first and second pressing tabs 44, 64. The first sidewall 110 of the storage device 100 is pressed by the elastic pads 48 of the first side panel 14. The second sidewall 120 is firmly secured to the second side panel 16 of the bracket by the screws 80. Thus the storage device 100 is firmly secured to the bracket 10, and cannot move in any direction.

In the present invention, the first and second guide lips 45, 65 facilitate insertion of the storage device 100 into the bracket 10. The first and second support portions 42, 62 cooperate with the first and second tails 46, 66 of the first and second pressing tabs 44, 64 to prevent the storage device 100 from moving in vertical directions. The elastic pads 48 cooperate with the second side panel 16 to prevent the storage device 100 from moving in lateral directions. The screws 80 engaged in the screw holes 122 prevent the storage device 100 from moving in longitudinal directions. Furthermore, unlike in related art, additional sliding rails or fasteners are not necessary.

It is understood that other embodiments of the disk drive bracket of the present invention may be constructed. In particular, a disk drive bracket similar to the preferred embodiment described above can be integrally made to secure several data storage devices therein.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A disk drive bracket adapted for readily and firmly securing a data storage device therein, the disk drive bracket comprising:

a bottom panel;

a first side panel extending from an edge of the bottom panel, the first side panel comprising a first support portion, a first pressing tab formed above the first support portion, and a plurality of pads between the first support portion and the first pressing tab, the first pressing tab being adapted for pressing a top wall of the storage device, the pads being adapted for pressing a sidewall of the storage device; and a second side panel extending from an opposite edge of the bottom panel, the second side panel comprising a second support portion, a second pressing tab formed above the second support portion, and a plurality of through holes defined between the second support portion and the second pressing tab, the second pressing tab being adapted for pressing the top wall of the storage device, the through holes being adapted for insertion of fastening members therethrough to engage with the data storage device.

2. The disk drive bracket as claimed in claim 1, wherein the first pressing tab is stamped horizontally inwardly from the first side panel.

3. The disk drive bracket as claimed in claim 1, wherein the second pressing tab is stamped horizontally inwardly from the second side panel.

4. The disk drive bracket as claimed in claim 1, wherein the first and second support portions are coplanar, and are adapted for supporting the data storage device thereon.

5. The disk drive bracket as claimed in claim 1, wherein the first pressing tab comprises a first guide lip at a front thereof, and the second pressing tab comprises a second guide lip at a front thereof, the first and second guide lips facilitating insertion of the storage device into the bracket.

6. The disk drive bracket as claimed in claim 1, wherein the first pressing tab comprises a first tail at a rear portion thereof, and the second pressing tab comprises a second tail at a rear portion thereof, the first and second tails facilitating the first and second pressing tabs in pressing the data storage device.

7. The disk drive bracket as claimed in claim 1, wherein the pads are stamped inwardly from the first side panel, and a front portion of each of the pads is integrally joined with the first side panel.

8. The disk drive bracket as claimed in claim 1, wherein the pads of the first side panel are elastically deflectable.

9. The disk drive bracket as claimed in claim 6, wherein each of the first and second tails has a V-shaped configuration.

* * * * *